United States Patent
Schrell et al.

(10) Patent No.: US 12,292,014 B2
(45) Date of Patent: May 6, 2025

(54) GAS TURBINE ENGINE EXHAUST CHEVRONS

(71) Applicant: Rohr, Inc., Chula Vista, CA (US)

(72) Inventors: Johann Steven Schrell, San Diego, CA (US); Jihad Ramlaoui, Chula Vista, CA (US); Brian A. Sherman, Chula Vista, CA (US); Andrew John Strutt, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/129,612

(22) Filed: Dec. 21, 2020

(65) Prior Publication Data

US 2022/0195960 A1    Jun. 23, 2022

(51) Int. Cl.
| | | |
|---|---|---|
| *F02K 1/48* | (2006.01) | |
| *F02K 1/38* | (2006.01) | |
| *F02K 3/06* | (2006.01) | |

(52) U.S. Cl.
CPC ............ *F02K 1/48* (2013.01); *F02K 1/386* (2013.01); *F02K 3/06* (2013.01); *F05D 2220/323* (2013.01); *F05D 2240/128* (2013.01); *F05D 2260/96* (2013.01)

(58) Field of Classification Search
CPC .......... F02K 1/04; F02K 1/52; F02K 1/78–82; F02K 1/827; F02K 1/386; F02K 1/48; F02K 1/46; F02K 1/80; F02K 1/805; B64D 33/04–06; F05D 2260/30–39; F05D 2230/51–52; F05D 2230/61; F05D 2250/11; F05D 2250/13; F05D 2250/183; F05D 2250/184; F05D 2250/713
See application file for complete search history.

(56) References Cited

U.S. PATENT DOCUMENTS

| | | | |
|---|---|---|---|
| 6,532,729 B2 | 3/2003 | Martens | |
| 7,305,817 B2 | 12/2007 | Blodgett et al. | |
| 7,926,285 B2 * | 4/2011 | Tisdale | F02K 1/48 |
| | | | 60/770 |
| 7,963,099 B2 * | 6/2011 | Renggli | F02K 1/48 |
| | | | 60/770 |
| 8,356,468 B2 | 1/2013 | Cerra et al. | |
| 8,887,489 B2 * | 11/2014 | Sylla | F02K 1/386 |
| | | | 60/770 |

(Continued)

FOREIGN PATENT DOCUMENTS

| | | | | |
|---|---|---|---|---|
| DE | 102006019299 | 11/2007 | | |
| GB | 2289921 A * | 12/1995 | ............ | F02K 1/386 |

(Continued)

OTHER PUBLICATIONS

European Patent Office; European Search Report dated May 6, 2022 in Application No. 21216217.6.

(Continued)

*Primary Examiner* — Stephanie Sebasco Cheng
(74) *Attorney, Agent, or Firm* — SNELL & WILMER L.L.P.

(57) ABSTRACT

A chevron ring is disclosed. In various embodiments, the chevron ring includes an attachment ring; and a chevron, the chevron connected to and extending downstream of the attachment ring and having a trailing edge portion, the chevron defining a hollow portion between the attachment ring and the trailing edge portion.

9 Claims, 10 Drawing Sheets

(56) References Cited

U.S. PATENT DOCUMENTS

| | | | |
|---|---|---|---|
| 2005/0229585 A1 | 10/2005 | Webster | |
| 2008/0202847 A1* | 8/2008 | Porte | F02K 3/06 |
| | | | 181/213 |
| 2009/0019857 A1 | 1/2009 | Tisdale et al. | |
| 2009/0320487 A1* | 12/2009 | Alkislar | F02K 1/34 |
| | | | 60/771 |
| 2010/0193605 A1 | 8/2010 | Johnson et al. | |
| 2016/0138416 A1 | 5/2016 | Baltas et al. | |
| 2016/0138424 A1 | 5/2016 | Ward | |
| 2017/0130672 A1 | 5/2017 | Ganz | |

FOREIGN PATENT DOCUMENTS

| | | |
|---|---|---|
| RU | 2310766 | 11/2007 |
| RU | 2310766 C1 * | 11/2007 |

OTHER PUBLICATIONS

European Patent Office, European Office Action dated Sep. 2, 2024 in Application No. 21216217.6.

* cited by examiner

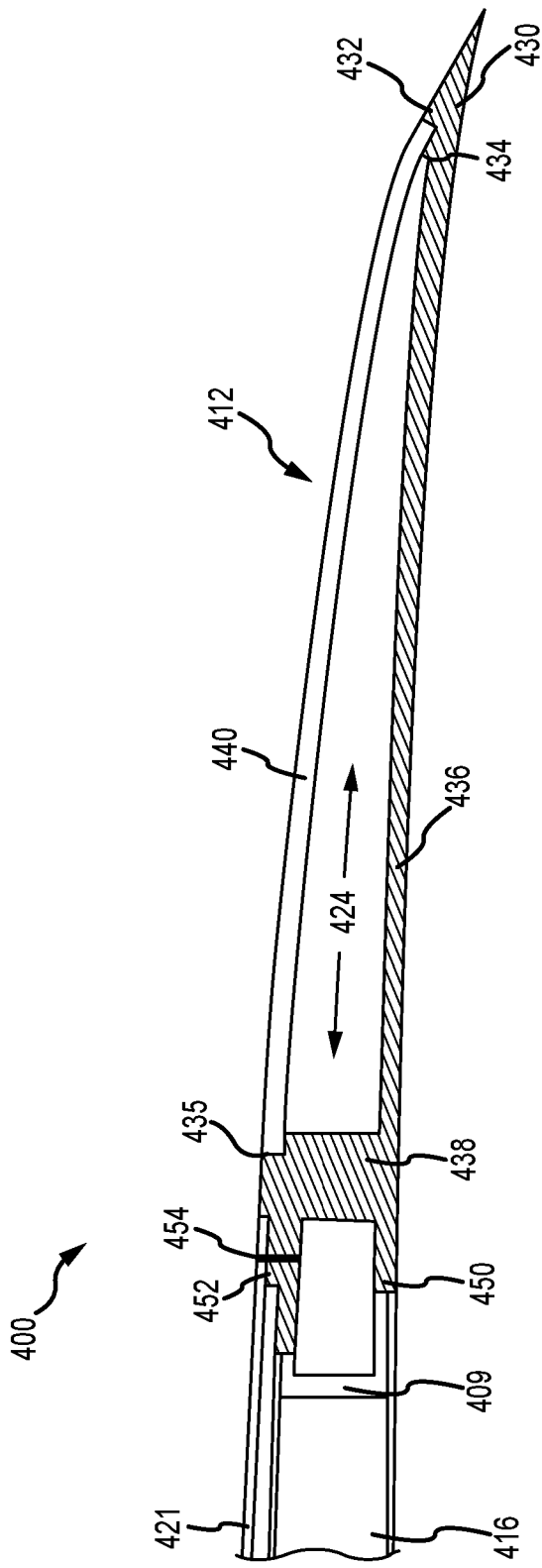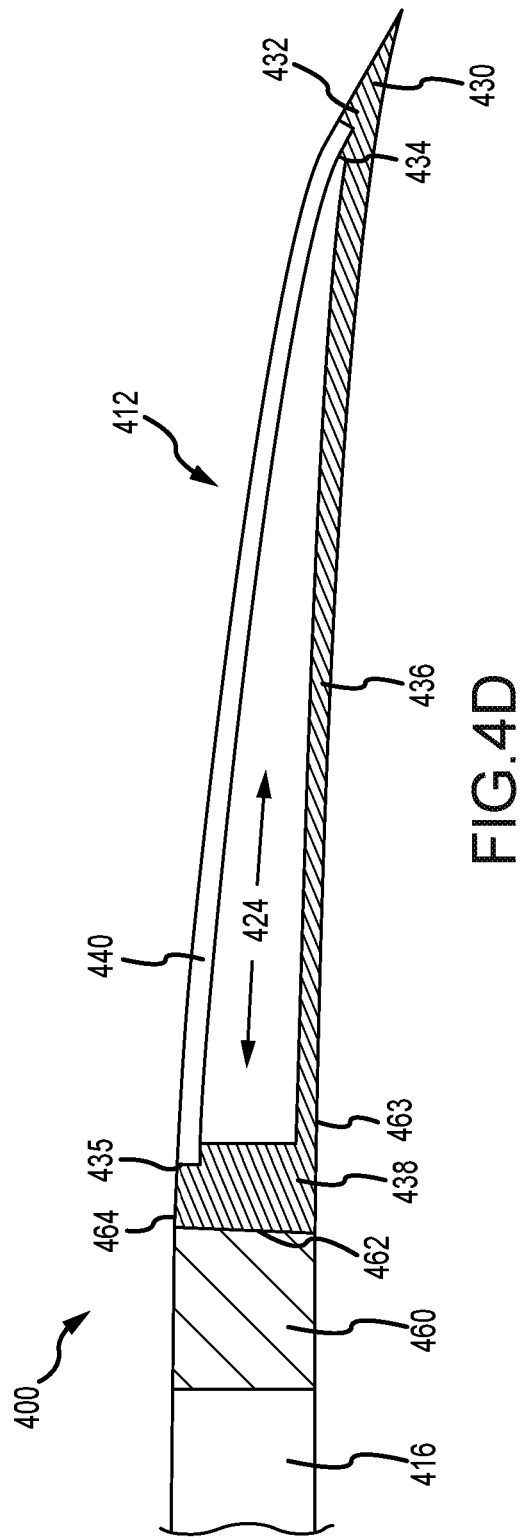

GAS TURBINE ENGINE EXHAUST CHEVRONS

FIELD

The present disclosure relates generally to gas turbine engines and, more particularly, to gas turbine engine systems having exhaust systems configured to reduce acoustic noise.

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor section and the turbine section may include alternating series of rotating blades and stationary vanes that extend into a core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

The generation of noise from gas turbine engine exhaust systems is of significant practical interest for low and moderate bypass ratio engines used in subsonic civil transports. The gas turbine engine exhaust noise is one component of overall engine noise and is particularly important at take-off and cutback conditions. For high bypass ratio engines, the gas turbine engine noise contribution is reduced, for example, by using a geared gas turbine engine, but noise is still a factor especially with continually tightening of noise restrictions.

SUMMARY

A chevron ring is disclosed. In various embodiments, the chevron ring includes an attachment ring; and a chevron, the chevron connected to and extending downstream of the attachment ring and having a trailing edge portion, the chevron defining a hollow portion between the attachment ring and the trailing edge portion.

In various embodiments, the chevron ring defines a nominal surface area bounded by the attachment ring and the trailing edge portion and the hollow portion defines a cutout surface area of between twenty percent and ninety percent of the nominal surface area. In various embodiments, the chevron ring defines a nominal thickness at the trailing edge portion and the hollow portion defines a depth of between twenty percent and ninety percent of the nominal thickness. In various embodiments, a cover skin is configured to cover the hollow portion. In various embodiments, the hollow portion comprises a plurality of holes. In various embodiments, the chevron ring comprises a multi-piece-chevron ring.

In various embodiments, the chevron ring defines a nominal surface area bounded by the attachment ring and the trailing edge portion and the hollow portion defines a cutout surface area of between twenty percent and ninety percent of the nominal surface area and the hollow portion extends completely through a nominal thickness of the chevron ring. In various embodiments, a first cover skin is configured to cover a radially outer side of the hollow portion and a second cover skin is configured to cover a radially inner side of the hollow portion. In various embodiments, the hollow portion comprises a plurality of holes. In various embodiments, the chevron ring comprises a multi-piece-chevron ring.

An exhaust nozzle is disclosed. In various embodiments, the exhaust nozzle includes a core; and a chevron ring attached to the core, the chevron ring including an attachment portion and a chevron, the chevron connected to and extending downstream of the attachment portion and having a trailing edge portion, the chevron defining a hollow portion between the attachment portion and the trailing edge portion. In various embodiments, the attachment portion is attached to the core via at least one fastener or a weld. In various embodiments, the attachment portion is attached to the core via a rotary friction weld.

In various embodiments, the chevron ring defines a nominal surface area bounded by the attachment portion and the trailing edge portion and the hollow portion defines a cutout surface area of between twenty percent and ninety percent of the nominal surface area. In various embodiments, the chevron ring defines a nominal thickness at the trailing edge portion and the hollow portion defines a depth of between twenty percent and ninety percent of the nominal thickness. In various embodiments, a cover skin is configured to cover the hollow portion. In various embodiments, the hollow portion comprises a plurality of holes.

In various embodiments, the chevron ring defines a nominal surface area bounded by the attachment portion and the trailing edge portion and the hollow portion defines a cutout surface area of between twenty percent and ninety percent of the nominal surface area and the hollow portion extends completely through a nominal thickness of the chevron ring. In various embodiments, a first cover skin configured to cover a radially outer side of the hollow portion and a second cover skin configured to cover a radially inner side of the hollow portion. In various embodiments, the hollow portion comprises a plurality of holes.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A, 4B, 4C, 4D and 4E illustrate various embodiments of a chevron ring and methods of attaching the chevron ring to a core to form a nozzle assembly, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
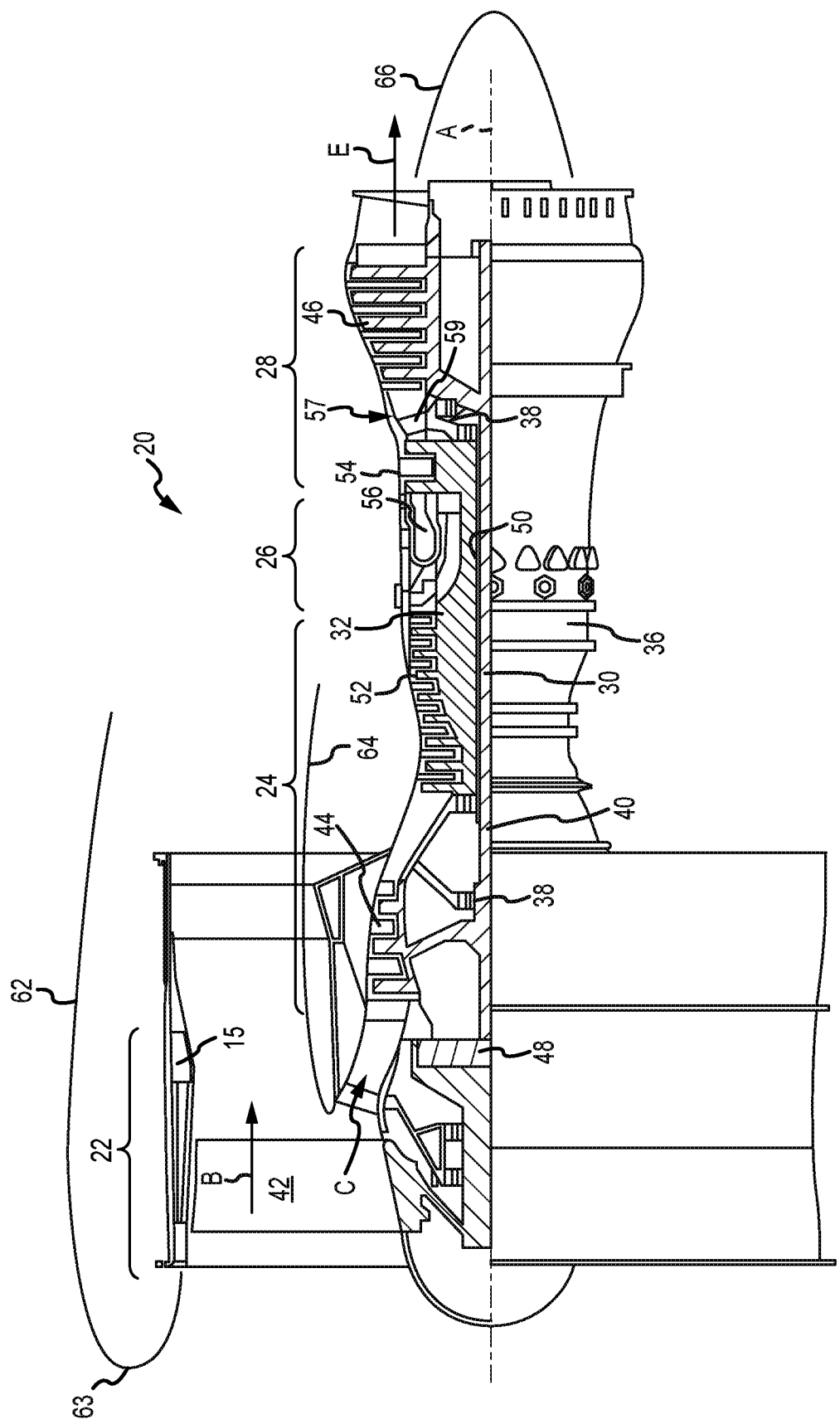
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than that of the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive respectively, the low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

The compressor section 24, the combustor section 26 and the turbine section 28 comprise a core engine arranged within a core nacelle 64. A tail cone 66 is arranged downstream from the core engine and is radially inward of the core nacelle 64. A core engine exhaust E exits the core engine between the core nacelle 64 and the tail cone 66. A fan nacelle 62 at least surrounds the core nacelle 64. The fan 42 is disposed inside the fan nacelle 62 upstream from the core engine and core nacelle 64. The fan nacelle 62 provides an inlet 63 that receives airflow into the gas turbine engine 20. The bypass flow path B exits between the fan nacelle 62 and core nacelle 64.

A geared gas turbine engine has a unique noise signature that is not present in non-geared gas turbine engines. More specifically, unlike conventional two spool gas turbine engines in which the fan rotates at the same speed as the low pressure compressor and the low pressure turbine, the gear of the exemplary embodiments herein enables the fan to rotate slower while at the same time enabling the low pressure compressor and the low pressure turbine to rotate faster. Thus, the exhaust configuration is tuned to reduce the type of noise unique to a geared gas turbine engine, though the disclosure contemplates applicability to any type of gas turbine engine, including one or both of the core engine exhaust $E_C$ and bypass flow path exhaust $E_B$.

Figure 2A:
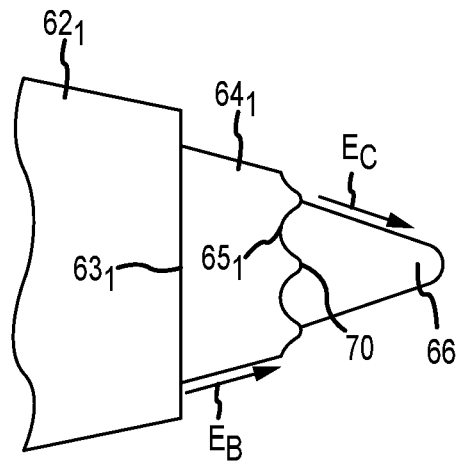
FIGS. 2A, 2B and 2C are side views illustrating various configurations of bypass and core engine exhaust systems, in accordance with various embodiments.
Figure 2B:
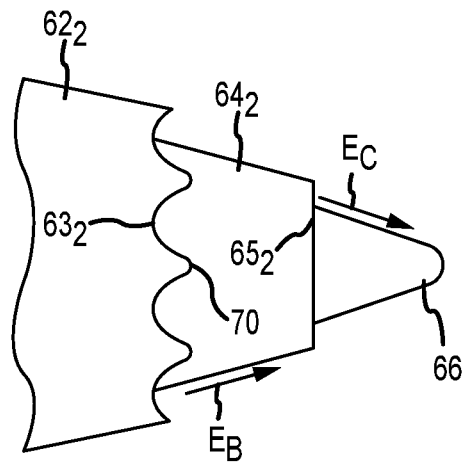
Figure 2C:
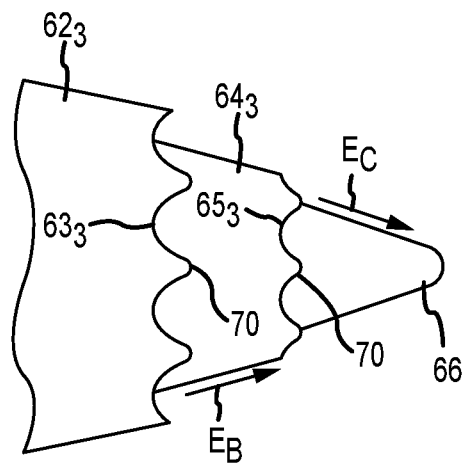

Referring now to FIGS. 2A, 2B and 2C, various configurations for both the core engine exhaust $E_C$ (about a tail cone, such as, for example, the tail cone 66 described above with reference to FIG. 1) and the bypass flow path exhaust $E_B$ are illustrated. Referring to FIG. 2A, for example, a fan nacelle $62_1$ exhibits a fan nozzle $63_1$ having a round exhaust profile, while a core nacelle $64_1$ exhibits a core nozzle $65_1$ having a plurality of chevrons 70 spaced about its circumference. Referring to FIG. 2B, a fan nacelle $62_2$ exhibits a fan nozzle $63_2$ having a plurality of chevrons 70 spaced about its circumference, while a core nacelle $64_2$ exhibits a core nozzle $65_2$ having a round exhaust profile. Referring to FIG. 2C, a fan nacelle $62_3$ exhibits a fan nozzle $63_3$ having a plurality of chevrons 70 spaced about its circumference and a core nacelle $64_3$ exhibits a core nozzle $65_3$ that also has a plurality of chevrons 70 spaced about its circumference.

Note that while the disclosure is directed primarily to various embodiments, represented by FIG. 2A, the disclosure is considered equally applicable to the various embodiments represented by FIGS. 2B and 2C. Note also that the term "chevron," as used herein, is intended to refer to a noise reduction feature positioned on or integrated into the core nozzle or the bypass nozzle. The chevrons are incorporated into the downstream exits of the nozzles to reduce noise and may comprise a variety of configurations, including triangular, circular, sinuous and elliptical shapes, among other shapes. Without loss of generality, this disclosure generally illustrates and describes sinuous shapes, but contemplates other shapes as well.

Figure 3A:
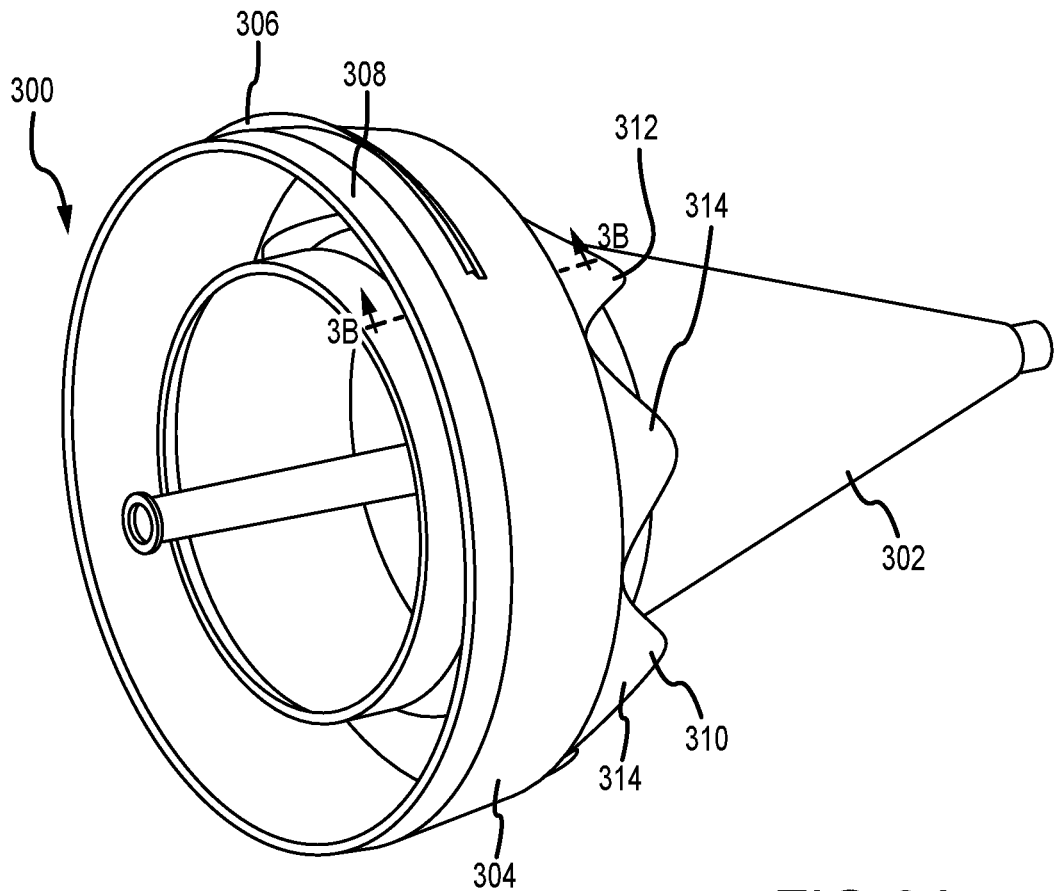
FIGS. 3A and 3B are perspective and cross sectional views of a nozzle assembly for a gas turbine engine and are provided, in accordance with various embodiments.
Figure 3B:
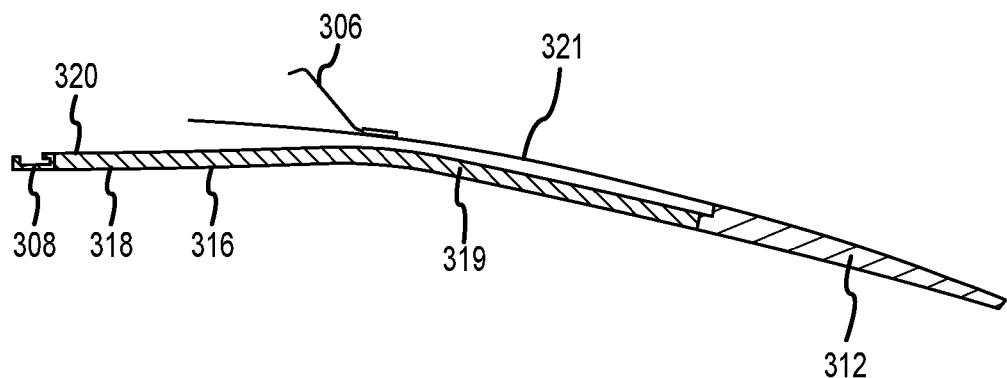

Referring now to FIGS. 3A and 3B, perspective and cross sectional views of a nozzle assembly 300 (or an exhaust nozzle assembly) for a gas turbine engine are provided. In various embodiments, the nozzle assembly 300 includes a tail cone 302, a fairing 304, a fire seal 306, an attachment flange 308 and a chevron ring 310, where the chevron ring 310 includes a chevron 312 (or a plurality of chevrons 314) extending from a core 316. The core 316 includes an inner skin 318 and an outer skin 320 configured to sandwich an interior that, in various embodiments, may include a honeycomb structure 319 configured to suppress noise. In various embodiments, a fairing skin 321 covers the core 316 and aerodynamically transitions into an upstream end of the chevron ring 310. As will be discussed further below, in various embodiments, the chevron ring 310 may be attached to the core 316 using various techniques, including, without limitation, liquid interface diffusion bonding, welding, fasteners or combinations thereof.

Figure 4A:
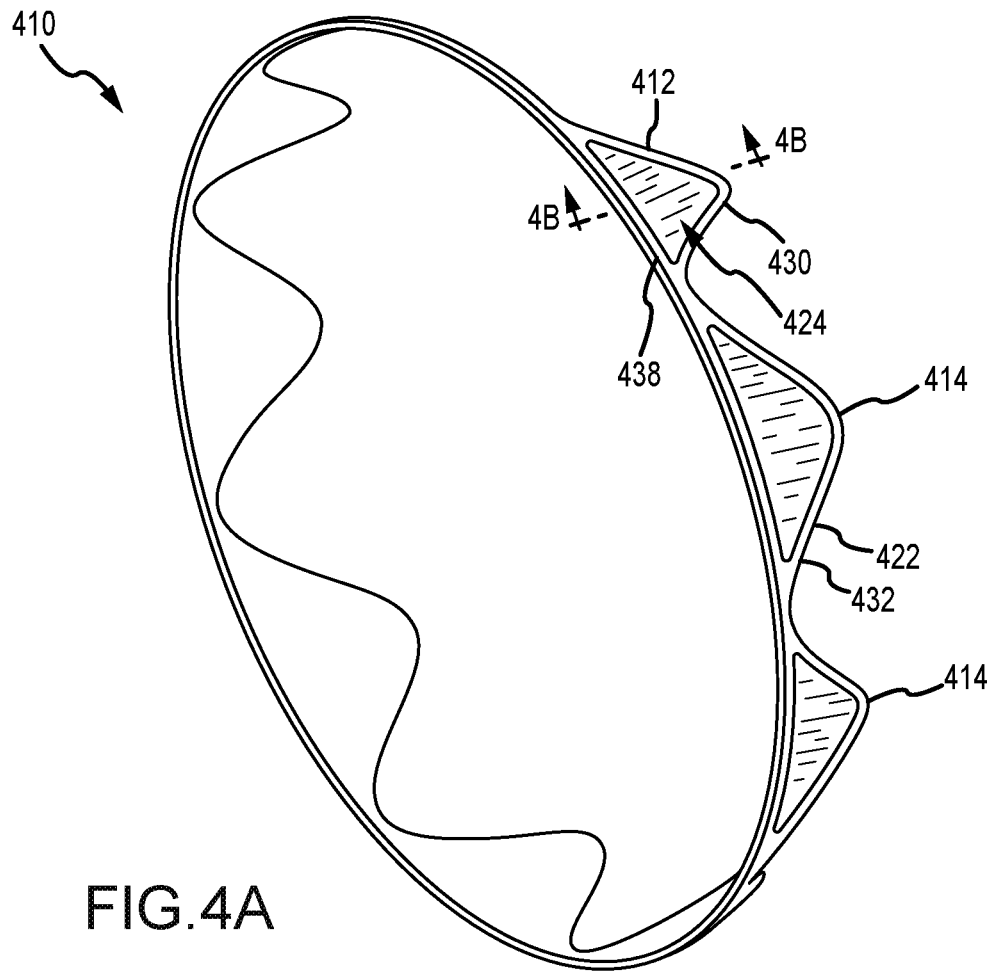
Figure 4B:
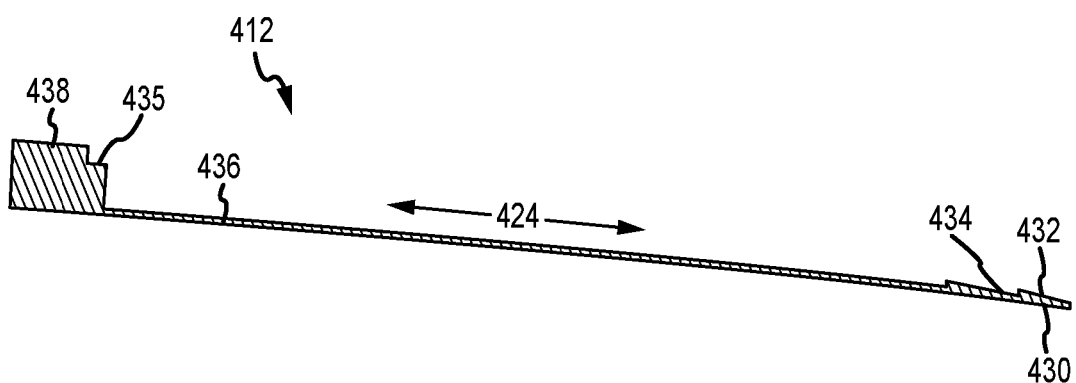

Referring now to FIGS. 4A, 4B, 4C, 4D and 4E, various embodiments of a chevron ring 410 and methods of attaching the chevron ring 410 to a core 416 to form a nozzle assembly 400 are described. Referring, for example, to FIGS. 4A and 4B, perspective and cross-sectional views of the chevron ring 410 are provided. The chevron ring 410 includes a chevron 412 (or a plurality of chevrons 414). The chevron 412 includes a downstream periphery 422 that defines a sinuous shape and provides an outer border for a hollow portion 424 (or a partially hollow portion) which, as illustrated in FIG. 4B, spans from a downstream portion 432 to an upstream attachment portion 438 (or an attachment ring). A shell portion 436 spans a surface area of the chevron 412 and provides a lower surface or a floor for the hollow portion 424. A trailing edge portion 430 (or the downstream portion 432) tracks the downstream periphery 422 in the sinuous shape referred to above and includes a downstream step portion 434 configured to receive a trailing edge portion of a cover skin configured to cover the hollow portion 424. Similarly, the upstream attachment portion 438 includes an upstream step portion 435 configured to receive an upstream edge portion of the cover skin configured to cover the hollow portion 424. In various embodiments, the chevron 412 defines a nominal thickness at the downstream portion 432 and the hollow portion 424 defines a depth of about twenty percent (20%) to about ninety percent (90%) of the nominal thickness, or, in various embodiments, a depth of about forty percent (40%) to about ninety percent (90%) of the nominal thickness, or, in various embodiments, a depth of about sixty percent (60%) to about ninety percent (90%) of the nominal thickness. Further, the chevron 412 defines a nominal surface area bounded by the upstream attachment portion 438 and the downstream portion 432, and the hollow portion 424 defines a cutout surface area of about twenty percent (20%) to about ninety percent (90%) of the nominal surface area, or, in various embodiments, a cutout surface area of about forty percent (40%) to about ninety percent (90%) of the nominal surface area or, in various embodiments, a cutout surface area of about sixty percent (60%) to about ninety percent (90%) of the nominal surface area.

Figure 4E:
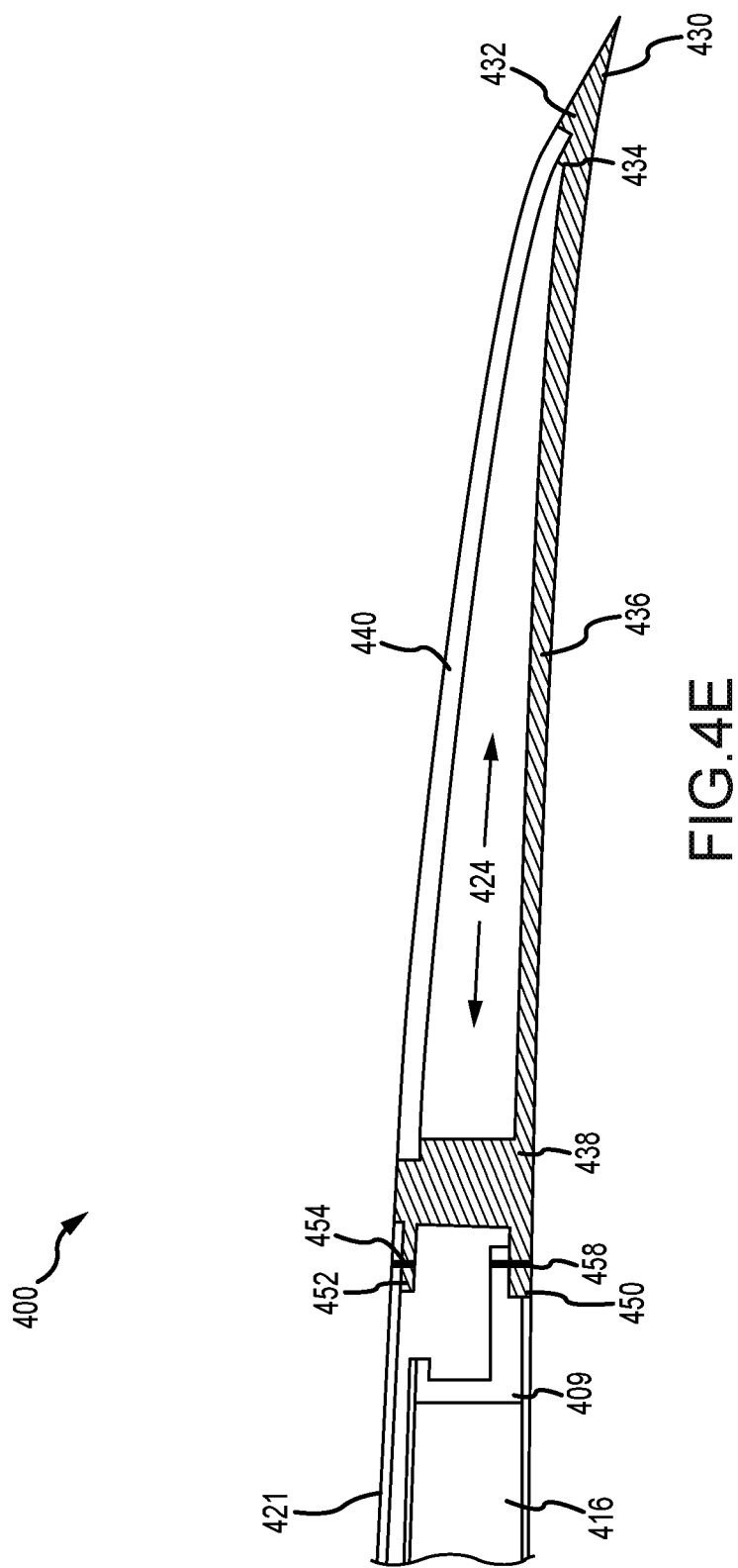

Referring more particularly to FIGS. 4C, 4D and 4E, and with continued reference to FIGS. 4A and 4B, various methods of attaching the chevron ring 410 to the core 416 are described. Referring to FIG. 4C, for example, the chevron ring 410 having the hollow portion 424 is illustrated with a cover skin 440 extending from the downstream step portion 434 to the upstream step portion 435. In various embodiments, the cover skin 440 is secured via an adhesive, a weld or otherwise fastened to the downstream step portion 434 and to the upstream step portion 435. The upstream attachment portion 438 includes a radially inner flange 450 that is welded to a closeout seal 409 about the circumference of the chevron ring 410. In various embodiments, the upstream attachment portion 438 also includes a radially outer flange 452 that is welded to the closeout seal 409. In various embodiments, a fairing skin 421 may be fastened via a fastener 454, or via a plurality of fasteners spaced circumferentially about the radially outer flange 452. As further illustrated, the closeout seal 409 is secured to the core 416 via any suitable technique, such as, for example, an adhesive or other suitable fastener.

Referring now to FIG. 4D, a similar nozzle assembly 400 is illustrated, where the chevron 412 includes the hollow portion 424 bounded by shell portion 436 and the cover skin 440 extending from the downstream step portion 434 to the upstream step portion 435. In various embodiments, the upstream attachment portion 438 is welded to a panel ring 460 at a circumferential face 462 that extends from a radially inner surface 463 to a radially outer surface 464 of the upstream attachment portion 438 and the panel ring 460. In various embodiments, the welding at the circumferential face 462 is accomplished via a rotary friction process, whereby the two surfaces meeting at the circumferential face 462 are heated until they reach a plastic state and then forged together by an axial load, creating a welded joint (or a rotary friction weld) across the circumferential face 462.

Referring now to FIG. 4E, a similar nozzle assembly 400 is illustrated, where the chevron 412 includes the hollow portion 424 bounded by shell portion 436 and the cover skin 440 extending from the downstream step portion 434 to the upstream step portion 435. The upstream attachment portion 438 includes a radially inner flange 450 that is fastened via a fastener 458, or via a plurality of fasteners spaced circumferentially about the radially inner flange 450, to a closeout seal 409. In various embodiments, the upstream attachment portion 438 also includes a radially outer flange 452 that is similarly fastened to the fairing skin 421 via a fastener 454, or via a plurality of fasteners spaced circumferentially about the radially outer flange 452. As further illustrated, the closeout seal 409 is secured to the core 416 via any suitable technique, such as, for example, an adhesive or other suitable fastener.

Figure 5A:
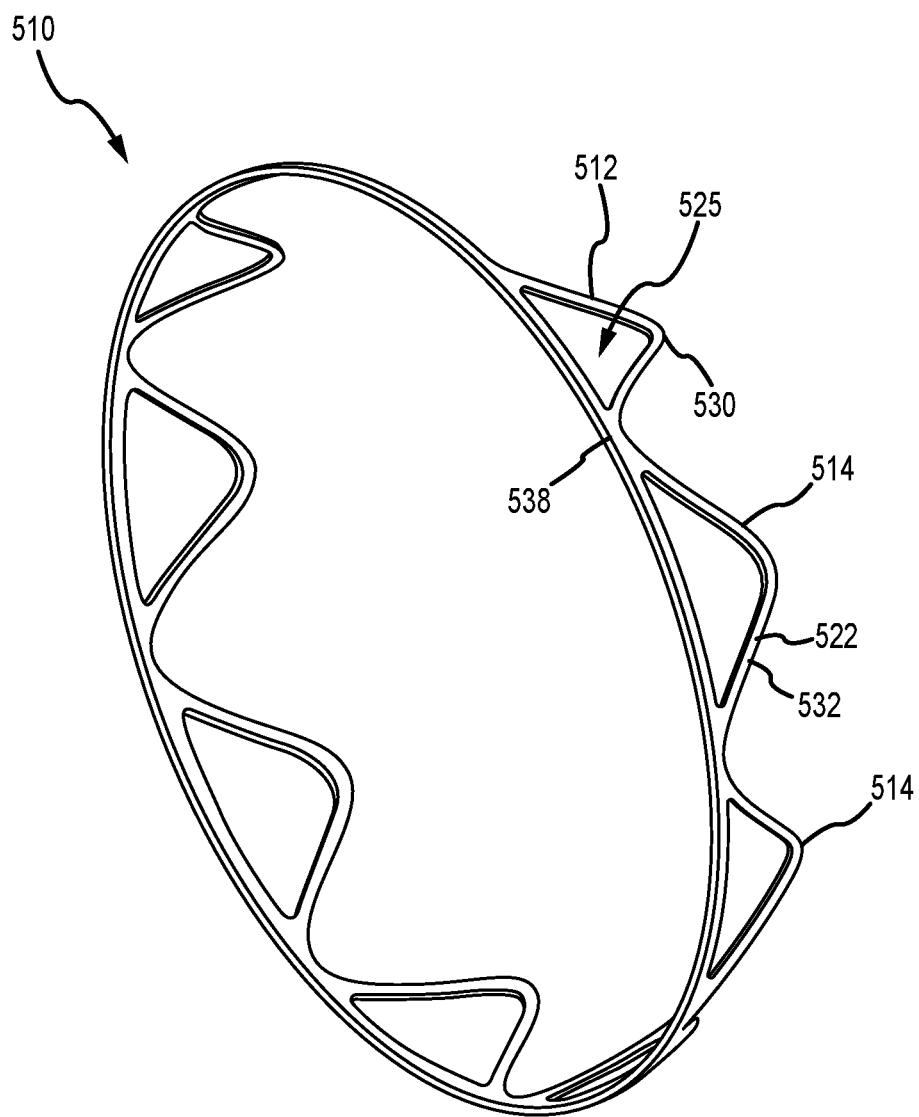
FIGS. 5A and 5B illustrate various embodiments of a chevron ring and methods of attaching the chevron ring to a core to form a nozzle assembly, in accordance with various embodiments.
Figure 5B:
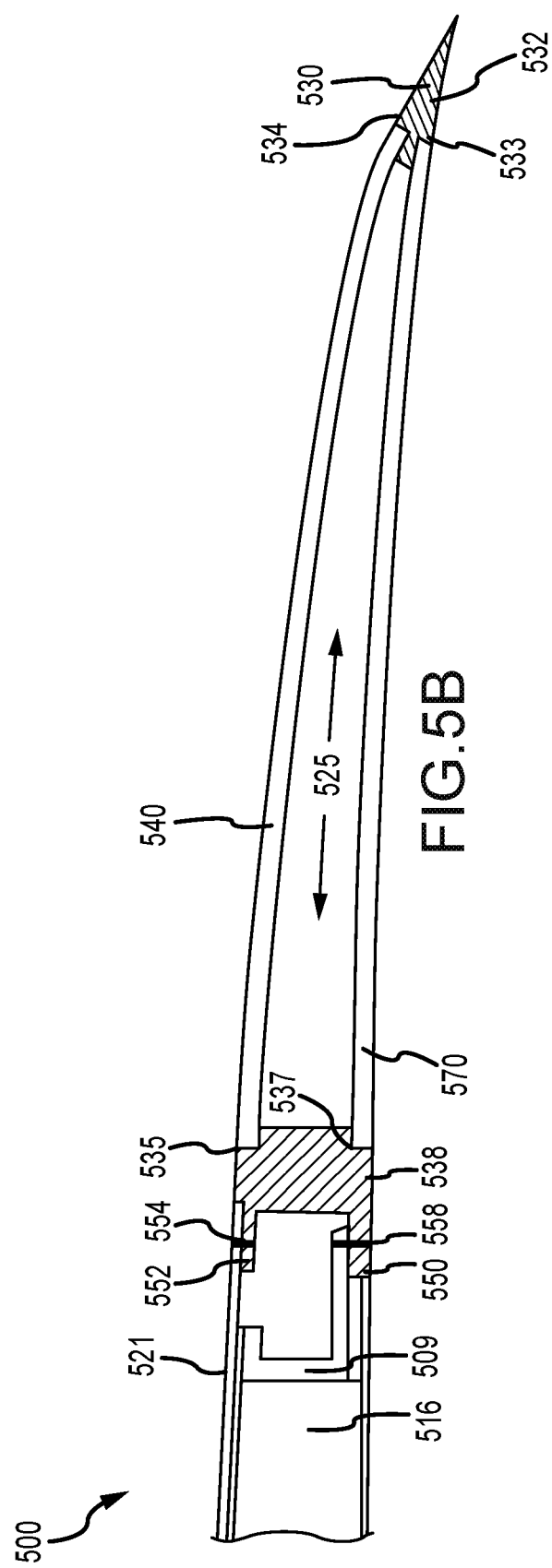

Referring now to FIGS. 5A and 5B, various embodiments of a chevron ring 510 and methods of attaching the chevron ring 510 to a core 516 to form a nozzle assembly 500 are described. Referring, for example, to FIG. 5A, a perspective view of the chevron ring 510 is provided. The chevron ring 510 includes a chevron 512 (or a plurality of chevrons 514). The chevron 512 includes a downstream periphery 522 that defines a sinuous shape and provides an outer border for a hollow portion 525 which, as illustrated in FIG. 5B, spans from a downstream portion 532 to an upstream attachment portion 538. Unlike the hollow portion 424 described above with reference to FIGS. 4A-4E, the hollow portion 525 is a fully hollow portion that extends completely through the chevron 512. A trailing edge portion 530 tracks the downstream periphery 522 in the sinuous shape referred to above and includes a first downstream step portion 534 configured to receive a trailing edge portion of a cover skin configured to cover the hollow portion 525. Similarly, the upstream attachment portion 538 includes a first upstream step portion 535 configured to receive an upstream edge portion of the cover skin configured to cover the hollow portion 525.

Referring more particularly to FIG. 5B, and with continued reference to FIG. 5A, a method of attaching the chevron ring 510 to the core 516 is described. In various embodiments, for example, the chevron ring 510 having the hollow portion 525 is illustrated with a first cover skin 540 extending from the first downstream step portion 534 to the first upstream step portion 535. In various embodiments, the first cover skin 540 is secured via an adhesive, a weld or otherwise fastened to the first downstream step portion 534 and to the first upstream step portion 535. The chevron ring 510 is illustrated with a second cover skin 570 extending from a second downstream step portion 533 to a second upstream step portion 537. In various embodiments, the second cover skin 570 is secured via an adhesive or otherwise welded or fastened to the second downstream step portion 533 and to the second upstream step portion 537. As illustrated, the first cover skin 540 and the second cover skin 570 enclose the hollow portion 525. The upstream attachment portion 538 includes a radially inner flange 550 that is fastened via a fastener 558, or via a plurality of fasteners spaced circumferentially about the radially inner flange 550, to a closeout seal 509. In various embodiments, the upstream attachment portion 538 also includes a radially outer flange 552 that is similarly fastened to a fairing skin 521 via a fastener 554, or via a plurality of fasteners spaced circumferentially about the radially outer flange 552. As further illustrated, the closeout seal 509 is secured to the core 516 via any suitable technique, such as, for example, an adhesive or other suitable fastener. While FIG. 5B includes a similar manner of attachment as described in reference to FIG. 4E, the disclosure is not limiting in this regard, and contemplates the manners of attachment described in reference to FIGS. 4C and 4D as well.

Figure 6:
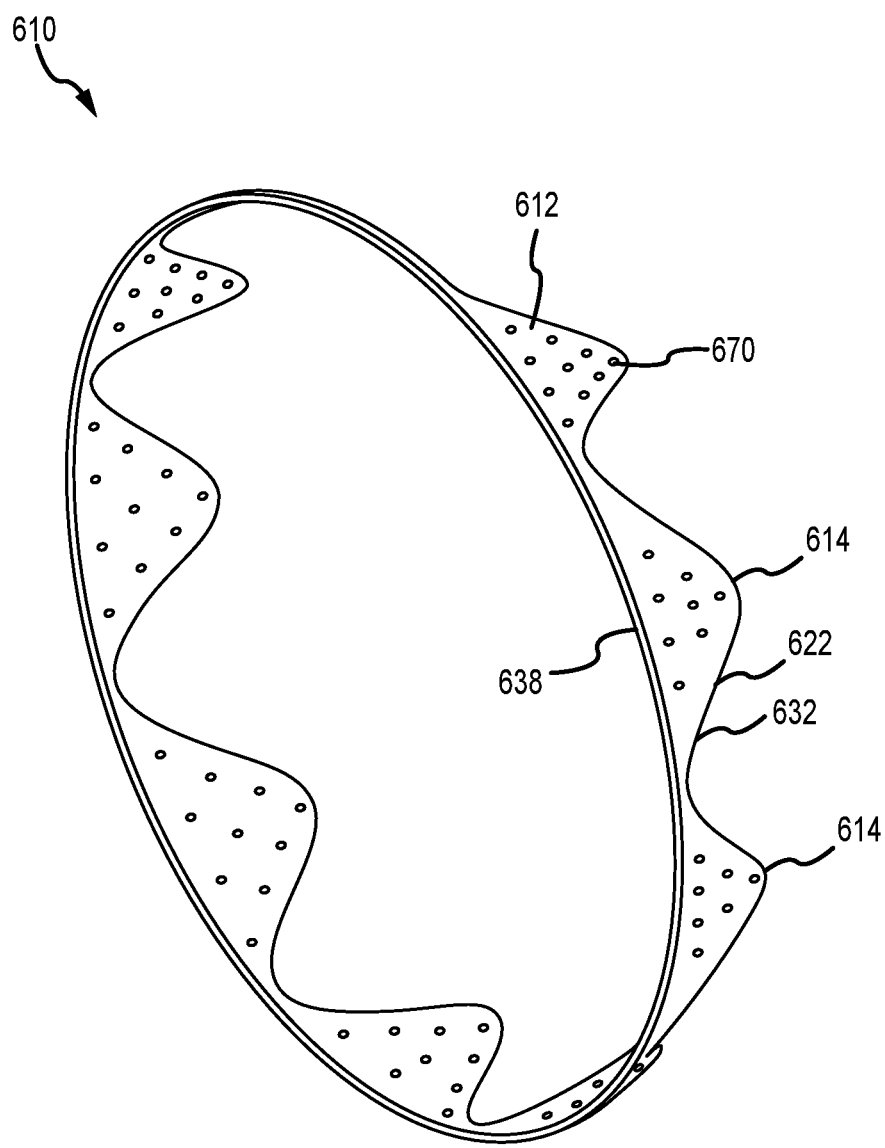
FIG. 6 illustrates a chevron ring, in accordance with various embodiments.

Referring now to FIG. 6, various embodiments of a chevron ring 610 are described. The chevron ring 610 includes a chevron 612 (or a plurality of chevrons 614). The chevron 612 includes a downstream periphery 622 that defines a sinuous shape. Similar to the above description regarding the chevron ring 410 and the chevron ring 510, the chevron ring 610 spans from a downstream portion 632 to an upstream attachment portion 638. In contrast to the chevron ring 410 having the hollow portion 424 (or the partially hollow portion) or to the chevron ring 510 having the hollow portion 524 (or the fully hollow portion), the chevron ring 610 includes a plurality of holes 670, each of which may be formed to extend partially through the chevron ring 610 or fully through the chevron ring 610. In various embodiments, each of the manners of attachment of the chevron ring 410 and the chevron ring 510 to, respectively, the closeout seal 409 and the closeout seal 509 and to the core 416 and the core 516 are contemplated for the chevron ring 610. Further, each of the manners of attachment of the cover skins (e.g., the cover skin 440 described with reference to FIGS. 4C-4E or one or both of the first cover skin 540 and the second cover skin 570 described with reference to FIG. 5B) are contemplated by this disclosure as suitable for covering the plurality of holes 670. Accordingly, those details are not repeated here.

Figure 7:
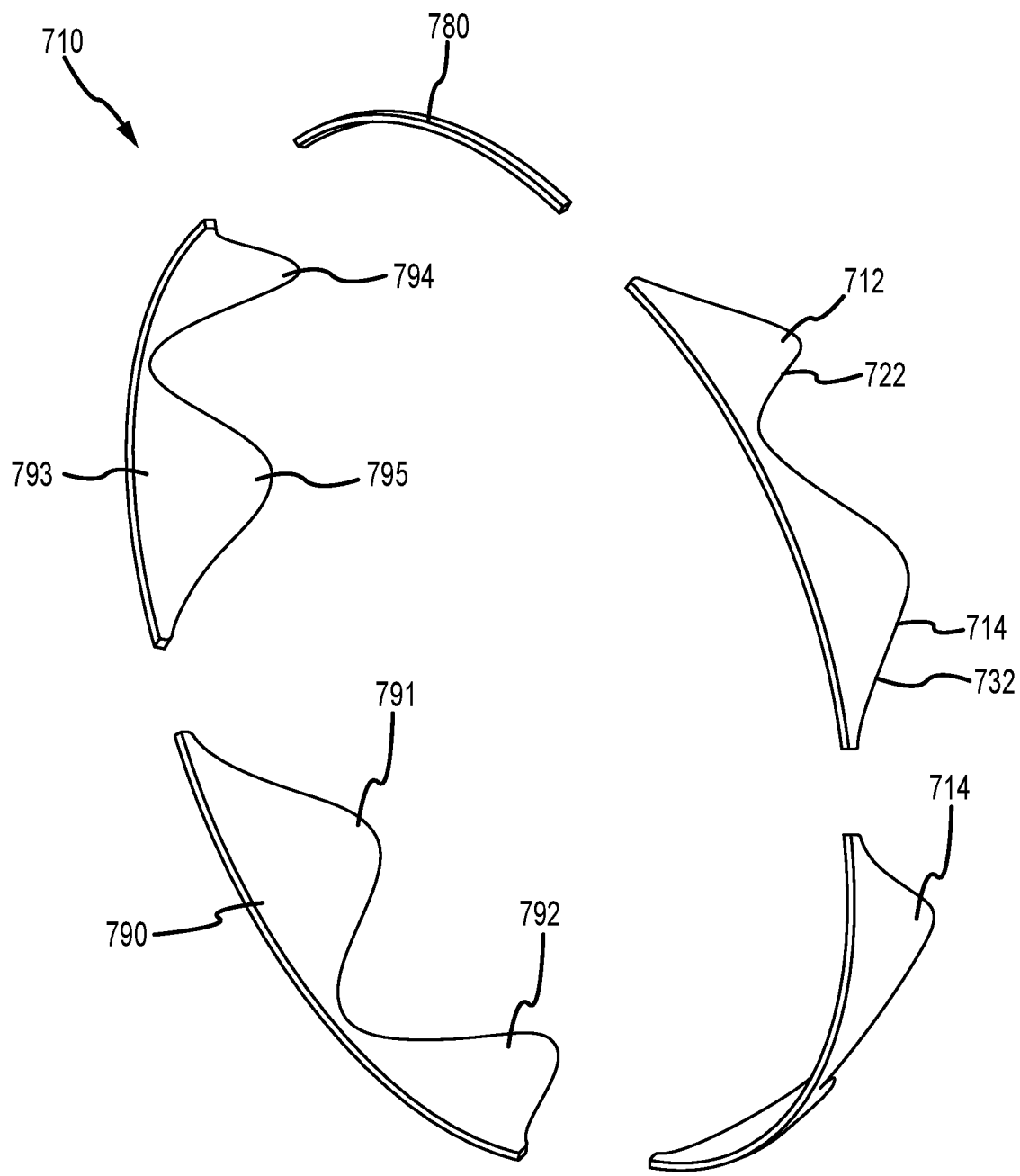
FIG. 7 illustrates a multi-piece chevron ring, in accordance with various embodiments.

Referring now to FIG. 7, various embodiments of a multi-piece-chevron ring 710 are described. Similar to the various embodiments above described, the multi-piece-chevron ring 710 includes a chevron 712 (or a plurality of chevrons 714). The chevron 712 includes a downstream periphery 722 that defines a sinuous shape. Similar to the above description regarding the chevron ring 410, the chevron ring 510 and the chevron ring 610, the multi-piece-chevron ring 710 spans from a downstream portion 732 to an upstream attachment portion 738. In contrast to the chevron rings above described, however, the multi-piece-chevron ring 710 is fabricated from multiple segments, such as, for example, a first segment 790 having a first chevron 791 and a second chevron 792 and a second segment 793 having a third chevron 794 and a fourth chevron 795. Note that each of the segments are identical in shape, meaning a single forging unit may be employed to fabricate the various segments. In various embodiments, the multi-piece-chevron ring 710 also includes a pylon segment 780 configured for attachment proximate a pylon of an aircraft. In various embodiments, each of the configurations described above for the chevron ring 410 having the hollow portion 424 (or the partially hollow portion) and the chevron ring 510 having the hollow portion 524 (or the fully hollow portion) are contemplated as applicable to the multi-piece-chevron ring 710, and each of the manners of attachment of the cover skins (e.g., the cover skin 440 described with reference to FIGS. 4C-4E or one or both of the first cover skin 540 and the second cover skin 570 described with reference to FIG. 5B) are contemplated as applicable to the multi-piece-chevron ring 710. Further, in various embodiments, each of the manners of attachment of the chevron ring 410 and the chevron ring 510 to, respectively, the closeout seal 409 and the closeout seal 509 and to the core 416 and the core 516 are contemplated as applicable for the multi-piece-chevron ring 710. Accordingly, those details are not repeated here.

The foregoing disclosure provides a chevron ring that is lightweight and relatively straightforward to manufacture. The various components of the chevron rings disclosed above may be fabricated (e.g., forged) from any high temperature capable material, such as, for example, titanium or various alloys of titanium (e.g., Ti-6-4). The resulting chevron rings exhibit a weight saving of more than fifty percent (50%) over their constant thickness counterparts (e.g., chevron rings having chevrons with no hollow portion). The resulting chevron rings are also readily amenable to attachment to core structures (e.g., via welding or fasteners) to provide finished engine components such as, for example, core engine exhaust nozzle structures or assembled gas turbine engine structures having the benefits described above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A multi-piece-chevron ring for an exhaust nozzle assembly of a gas turbine engine, comprising:
    a plurality of segments annularly arranged with a pylon segment to form an annulus about a central longitudinal axis of the gas turbine engine, the pylon segment configured for attachment proximate a pylon of an aircraft comprising the gas turbine engine;
    each of the plurality of segments comprising:
        an attachment portion extending radially from a radially inner side to a radially outer side relative to the longitudinal axis,
        a trailing edge portion, and
        a hollow portion located between the attachment portion and the trailing edge portion;
    each attachment portion comprising:
        an upstream side,
        a downstream side,
        an upstream step portion located on the downstream side of the attachment portion,
        an inner flange on the radially inner side of the attachment portion and extending upstream from the upstream side, and
        an outer flange on the radially outer side of the attachment portion and extending upstream from the upstream side,
        wherein the outer flange extends further upstream than the inner flange,
    wherein each attachment portion is configured to be coupled to a closeout seal, the closeout seal having an outer portion and an inner portion, the inner portion extending further downstream than the outer portion;
    wherein a first segment of the plurality of segments comprises:
        a first chevron comprising a first shell portion, and
        a second chevron comprising a second shell portion,
        wherein the first chevron and the second chevron extend downstream from the attachment portion of the first segment,
        wherein the first shell portion and the second shell portion are integrally formed with the attachment portion of the first segment,
        wherein a downstream portion of the first shell portion and a downstream portion of the second shell portion, together, form the trailing edge portion of the first segment; and
    wherein a second segment of the plurality of segments comprises:
        a third chevron, and
        a fourth chevron,
        wherein the third chevron and the fourth chevron are connected to and extending downstream from the attachment portion of the second segment,
        wherein a downstream portion of the third chevron and a downstream portion of the fourth chevron, together, form the trailing edge portion of the second segment; and
        wherein the attachment portions of the plurality of segments are annularly arranged with the pylon segment to form the annulus.

2. The multi-piece-chevron ring of claim 1, wherein the multi-piece-chevron ring defines a nominal surface area bounded by the attachment portions of the plurality of segments, and the trailing edge portions of the plurality of segments; and wherein the hollow portions of the p[plurality of segments defines a cutout surface area of between twenty percent and ninety percent of the nominal surface area.

3. The multi-piece-chevron ring of claim 2, wherein the plurality of segments defines a nominal thickness at the trailing edge portions and the hollow portions define a depth of between twenty percent and ninety percent of the nominal thickness.

4. The multi-piece-chevron ring of claim 3, wherein the first segment further comprises a first cover skin configured to cover the hollow portion of the first segment, wherein the first cover skin is located radially outward from the first and second shell portions, and wherein the upstream step portion of the attachment portion of the first segment is configured to receive a first end of the first cover skin.

5. An exhaust nozzle for a gas turbine engine comprising a core extending about an engine central longitudinal axis, the exhaust nozzle comprising:

a multi-piece-chevron ring attached to the core, wherein the multi-piece-chevron ring comprises a pylon segment and a plurality of segments, the pylon segment and the plurality of segments configured to be disposed circumferentially around the core in an annulus, each segment of the plurality of segments comprising:

an attachment portion extending radially from a radially inner side to a radially outer side relative to the engine central longitudinal axis, each attachment portion further comprising:

an upstream side, a downstream side, an upstream step portion located on the downstream side of the attachment portion, an inner flange on the radially inner side of the attachment portion and extending upstream from the upstream side, and an outer flange on the radially outer side of the attachment portion and extending upstream from the upstream side, wherein the outer flange extends further upstream than the inner flange;

a trailing edge portion;

a hollow portion located between the attachment portion and the trailing edge portion;

a first chevron with a first shell portion; and a second chevron with a second shell portion;

wherein each attachment portion is configured to be coupled to a closeout seal, the closeout seal having an outer portion and an inner portion, wherein the inner portion extends further in the downstream direction than the outer portion, wherein for each of the plurality of segments, the first chevron and the second chevron are extending downstream of the attachment portion, wherein for each of the plurality of segments, the first shell portion and the second shell portion are integrally formed with the attachment portion, wherein, for each of the plurality of segments, the first chevron and the second chevron define the hollow portion between the attachment portion and the trailing edge portion, and wherein the attachment portions of the plurality of segments are circumferentially arranged with the pylon segment to form the annulus.

6. The exhaust nozzle of claim 5, wherein a fairing skin extends downstream from the core, past the outer side of the closeout seal, and the inner side of the closeout seal, wherein the outer flange of the attachment portion of at least one of the plurality of segments is a coupled to the fairing skin, and wherein the attachment portion of the at least one of the plurality of segments is attached to the core via a respective fastener.

7. The exhaust nozzle of claim 5, wherein the multi-piece-chevron ring defines a nominal surface area bounded by the attachment portions of the plurality of segments and the trailing edge portions of the plurality of segments, and the hollow portions of the plurality of segments defines a cutout surface area of between twenty percent and ninety percent of the nominal surface area.

8. The exhaust nozzle of claim 7, wherein the multi-piece-chevron ring defines a nominal thickness at the trailing edge portions and the hollow portions define a depth of between twenty percent and ninety percent of the nominal thickness.

9. The exhaust nozzle of claim 8, further comprising a plurality of cover skins, each configured to cover a respective one of the hollow portions.

* * * * *